(12) United States Patent
Gibson et al.

(10) Patent No.: US 11,138,276 B2
(45) Date of Patent: Oct. 5, 2021

(54) METHOD AND APPARATUS FOR GENERATING A SEARCH QUERY FOR A SEARCH ENGINE

(71) Applicant: AT&T Intellectual Property I, L.P., Atlanta, GA (US)

(72) Inventors: Elizabeth Goldwyn Gibson, Austin, TX (US); Harry E. Blanchard, Rumson, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 345 days.

(21) Appl. No.: 16/020,084

(22) Filed: Jun. 27, 2018

(65) Prior Publication Data

US 2020/0004884 A1 Jan. 2, 2020

(51) Int. Cl.
*G06F 16/9535* (2019.01)
*G06F 16/242* (2019.01)

(52) U.S. Cl.
CPC ........ *G06F 16/9535* (2019.01); *G06F 16/243* (2019.01); *G06F 16/2428* (2019.01)

(58) Field of Classification Search
None
See application file for complete search history.

(56) References Cited

U.S. PATENT DOCUMENTS

| | | | |
|---|---|---|---|
| 6,598,042 B1 * | 7/2003 | Kienan | ............... G06F 16/3322 |
| 7,571,161 B2 | 8/2009 | Watson | |
| 7,933,907 B2 | 4/2011 | Staggs | |
| 8,370,329 B2 | 2/2013 | Gutt et al. | |
| 8,429,146 B2 | 4/2013 | Shen et al. | |
| 8,712,991 B2 * | 4/2014 | Wang | .................. G06F 16/3322 707/708 |
| 8,732,171 B2 | 5/2014 | Paparizos et al. | |
| 8,868,590 B1 * | 10/2014 | Donneau-Golencer | ...................... G06F 16/335 707/765 |
| 8,918,418 B2 | 12/2014 | Lee et al. | |
| 9,015,148 B2 | 4/2015 | White et al. | |
| 9,098,569 B1 | 8/2015 | Bhagat | |

(Continued)

FOREIGN PATENT DOCUMENTS

| | | |
|---|---|---|
| CN | 105447192 A | 3/2016 |
| CN | 107368553 A | 11/2017 |
| WO | 2018046607 A1 | 3/2018 |

OTHER PUBLICATIONS

Ageev, Mikhail et al., "Improving Search Result Summaries by Using Searcher Behavior Data", Emory Intelligent Information Access Lab; accessed Apr. 20, 2018, 3 pages.

Agichtein, Eugene, "Modeling and Inferring Searcher Intent by Mining User Interactions", Emory Intelligent Information Access Lab, Oct. 2017, 7 pages.

(Continued)

*Primary Examiner* — Son T Hoang
(74) *Attorney, Agent, or Firm* — Guntin & Gust, PLC; Dana Lemoine

(57) ABSTRACT

Aspects of the subject disclosure may include, for example, detecting, by a processing system including a processor, access to a search engine by a user; obtaining a user model associated with the user; generating, by the processing system, a search query according to the user model; and presenting an overlay on a graphical user interface of the search engine, wherein the graphical user interface includes the search query field, and wherein the overlay includes the search query. Other embodiments are disclosed.

20 Claims, 10 Drawing Sheets

(56) References Cited

U.S. PATENT DOCUMENTS

| | | | |
|---|---|---|---|
| 9,110,992 B2 | 8/2015 | Johnson et al. | |
| 9,268,857 B2 | 2/2016 | Johnson et al. | |
| 9,292,622 B2 | 3/2016 | Chandel et al. | |
| 9,317,585 B2 | 4/2016 | Heymans et al. | |
| 9,384,266 B1* | 7/2016 | Leicht | G06F 16/35 |
| 9,460,237 B2 | 10/2016 | Nguyen et al. | |
| 9,697,284 B2 | 7/2017 | Schneider | |
| 9,934,331 B2 | 4/2018 | Rampson et al. | |
| 2009/0313237 A1* | 12/2009 | Agrawal | G06F 16/3322 |
| 2010/0162164 A1 | 6/2010 | Kwon et al. | |
| 2010/0262615 A1* | 10/2010 | Oztekin | G06F 16/353 |
| | | | 707/768 |
| 2011/0202514 A1* | 8/2011 | Singh | G06F 16/29 |
| | | | 707/706 |
| 2011/0258148 A1 | 10/2011 | Gao et al. | |
| 2012/0284293 A1* | 11/2012 | Nierenberg | G06F 16/90324 |
| | | | 707/766 |
| 2013/0124490 A1 | 5/2013 | Naranjo et al. | |
| 2013/0132357 A1* | 5/2013 | Edgar | G06F 16/951 |
| | | | 707/706 |
| 2014/0188926 A1* | 7/2014 | Chandel | G06F 16/435 |
| | | | 707/767 |
| 2014/0372405 A1* | 12/2014 | Lee | G06F 16/951 |
| | | | 707/711 |
| 2016/0012104 A1 | 1/2016 | Petrov | |
| 2016/0063059 A1 | 3/2016 | Krauss | |
| 2016/0092511 A1* | 3/2016 | Liu | G06F 16/248 |
| | | | 707/770 |
| 2016/0098416 A1* | 4/2016 | Li | G06F 16/90324 |
| | | | 707/767 |
| 2017/0091211 A1* | 3/2017 | Kozlov | G06F 16/9535 |
| 2017/0177386 A1 | 6/2017 | Fung et al. | |
| 2018/0300426 A1* | 10/2018 | Harbison | G06F 40/242 |

OTHER PUBLICATIONS

Chuklin, Aleksandr et al., "Using Intent Information to Model User Behavior in Diversified Search", 2013, 12 pages.

Ding, et al., "Generating High-Quality Query Suggestion Candidates for Task-Based Search", 2017, 7 pages.

Garigliotti, et al., "Generating Query Suggestions to Support Task-Based Search", 2017, 4 pages.

Guo, Qi et al., "Mining touch interaction data on mobile devices to predict web search result relevance", Proceedings of the 36th international ACM SIGIR conference on Research and development in information retrieval, Jul. 28, 2013, 2 pages.

Henzinger, et al., "Query-Free News Search", 2005, 10 pages.

Hua, et al., "Identifying Users' Topical Tasks in Web Search", 2013, 10 pages.

Kong, Weize et al., "Predicting Search Intent Based on Pre-Search Context", Aug. 9, 2015, 10 pages.

Langun, Dimitry et al., "Discovering common motifs in cursor movement data for improving web search", Proceedings of the 7th ACM international conference on Web search and data mining, Feb. 24, 2014, 2 pages.

Lucchese, et al., "Identifying Task-based Sessions in Search Engine Query Logs", 2011, 10 pages.

Mitsui, et al., "Extracting Information Seeking Intentions for Web Search Sessions", 2016, 4 pages.

Smyth, et al., "Exploiting Query Repetition and Regularity in an Adaptive Community-Based Web Search Engine", 2004, 41 pages.

Sordoni, "A Hierarchical Recurrent Encoder-Decoder for Generative Context-Aware Query Suggestion", 2015, 10 pages.

Teevan, et al., "The Perfect Search Engine Is Not Enough: A Study of Orienteering Behavior in Directed Search", 2004, 8 pages.

Verma, et al., "Overview of the TREC Tasks Track 2016", 2016, 7 pages.

Wen, et al., "Query Clustering Using User Logs", 2013, 23 pages.

* cited by examiner

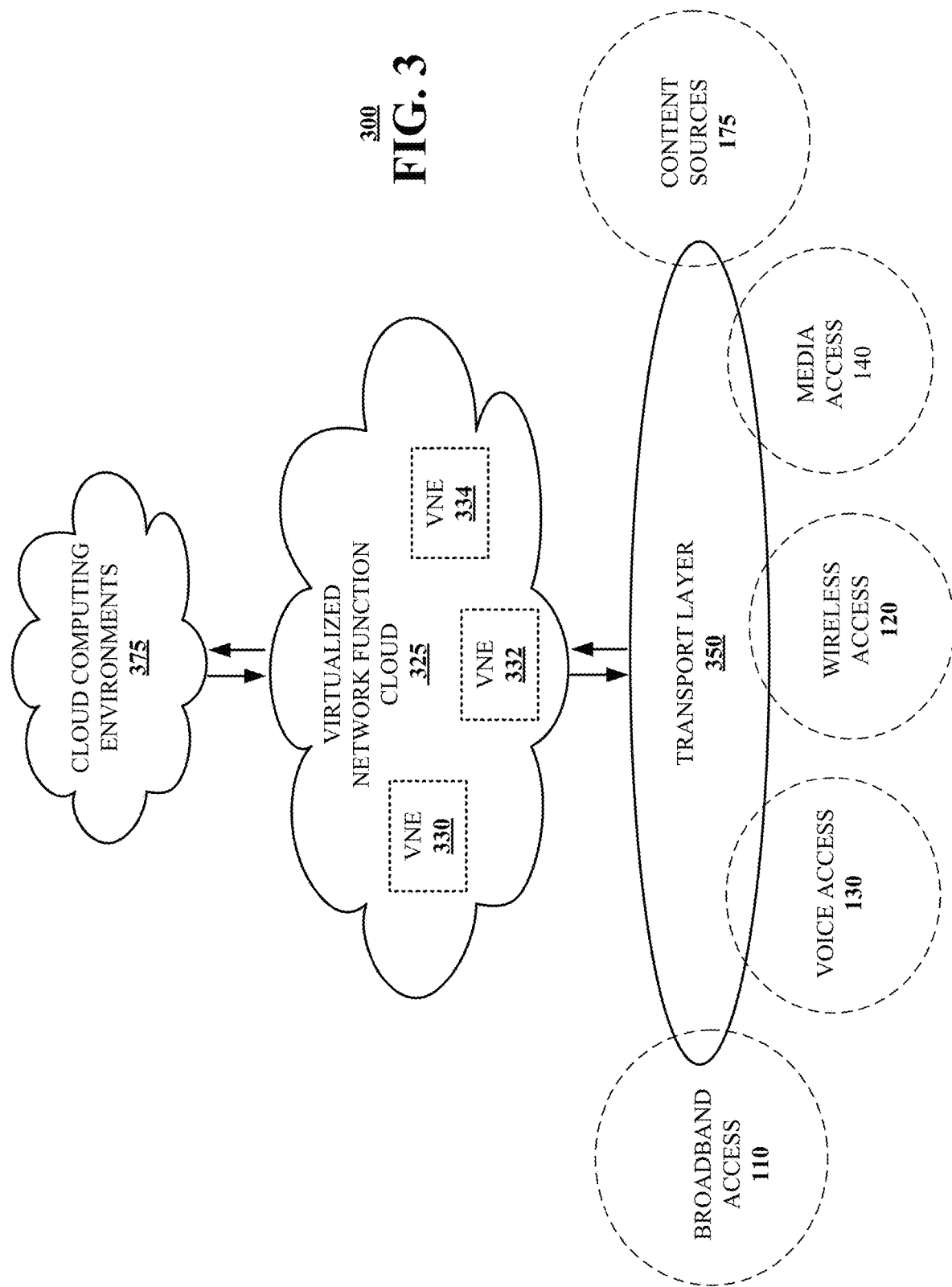

METHOD AND APPARATUS FOR GENERATING A SEARCH QUERY FOR A SEARCH ENGINE

FIELD OF THE DISCLOSURE

The subject disclosure relates to a method and apparatus for generating a search query for a search engine.

BACKGROUND

Users that are searching for information on the Internet often do not know what they are searching for or how to efficiently and effectively search for the information. Search engines as well as searching algorithms vary in terms of how databases are searched and how results are displayed. This variability can confuse users who may abandon a search when they do not get the expected results.

Some search engines conduct extensive research about how to most quickly provide the most relevant information for users. These search engines can frequently change their algorithm. These search engines can also introduce a bias or tendency in the results that are generated by their search algorithm.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
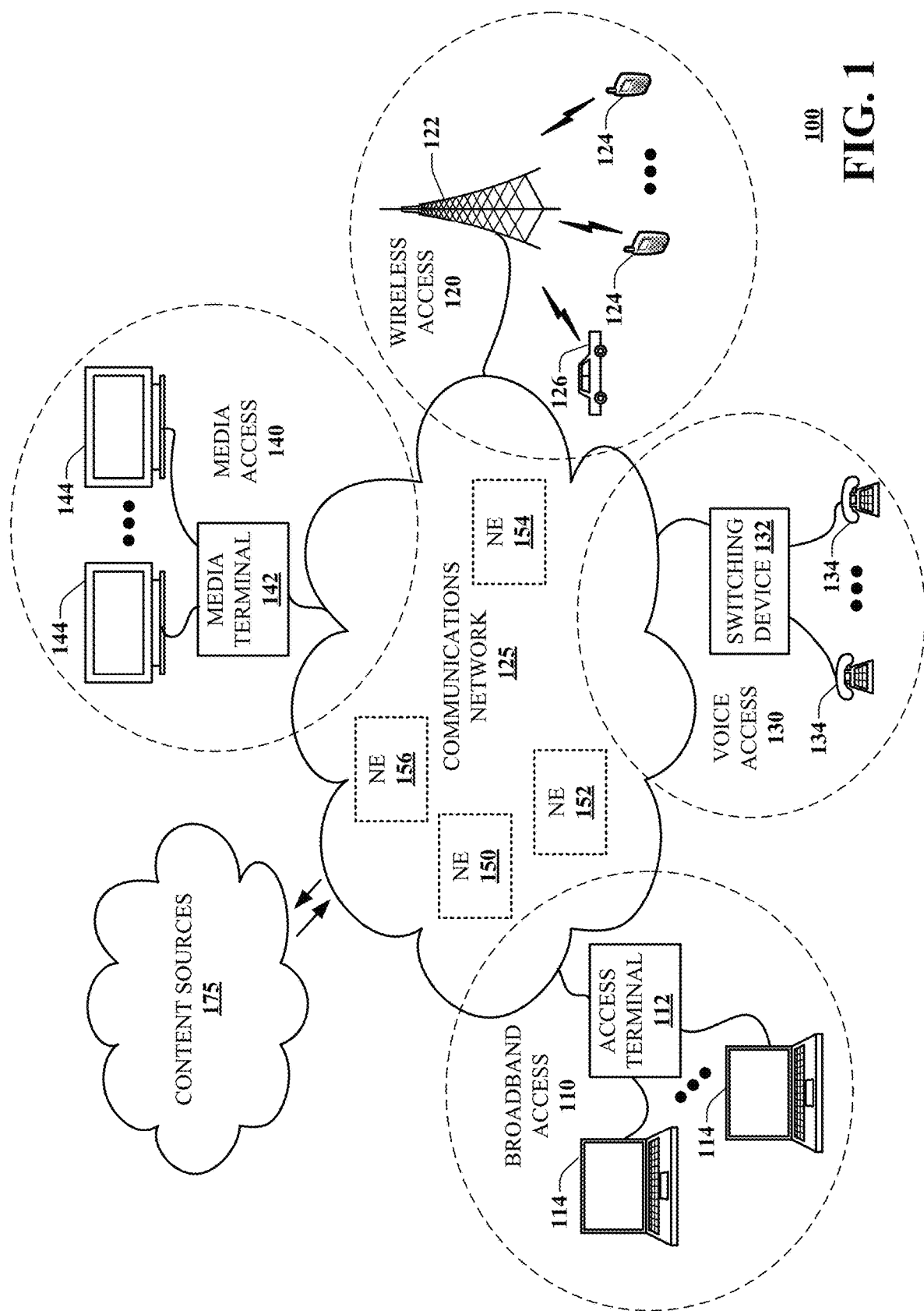
FIG. 1 is a block diagram illustrating an example, non-limiting embodiment of a communications network in accordance with various aspects described herein.

The subject disclosure describes, among other things, illustrative embodiments for determining one or more search queries for topics of interest of a user.

The topics of interest and/or the search queries can be determined or otherwise generated based on various factors including information associated with the user (e.g., demographics, media consumption history, purchasing history, and so forth) and/or other information that may not be associated with the user (e.g., current events). In one or more embodiments, the query engine can operate independent of the search entity (e.g., managed by different entities). In one or more embodiments, the query engine can learn from the search results generated by the search engine, such as determining biases of the search engine (e.g., without knowing the factors utilized by the search algorithm). In one or more embodiments, suggested search queries can be generated based on mitigating the biases of the search engine. In one embodiment, previously selected search queries and/or previously non-selected search queries can be monitored and utilized for adjusting a user model which is utilized for generating topics of interest and/or suggested search queries. In one or more embodiments, a query engine can be an algorithm, function, software, and/or hardware that can be utilized for generating all or a portion of a search query to be utilized by a search engine or other algorithm that performs searches of private and/or public information.

Other embodiments are described in the subject disclosure.

One or more aspects of the subject disclosure include a device that has a processing system including a processor and that has a memory that stores executable instructions. The instructions, when executed by the processing system, facilitate performance of operations. The processing system can detect access, by a user, to a search engine, where the access causes a search query field for the search engine to be presented at a display coupled to the device, and where a first entity that manages the search engine is identified and is distinct from a second entity that manages a user model associated with the user. The processing system can present a search query at the display, where the search query is generated according to the user model associated with the user, a topic of interest for the user that is predicted according to the user model, and an identity of the first entity. Generating of the search query can be performed prior to user input at the search query field. The user model can be generated based on current events, demographics of the user, a search history of the user, a media consumption history of the user, or a combination thereof.

One or more aspects of the subject disclosure is a method that includes detecting, by a processing system including a processor, access to a search engine by a user, where the access causes a search query field for the search engine to be presented at a display. The method can include obtaining, by the processing system, a user model associated with the user, where the user model is generated based on current events, demographics of the user, a search history of the user, a media consumption history of the user, or a combination thereof. The method can include predicting, by the processing system, a topic of interest for the user according to the user model. The method can include generating, by the processing system, a search query according to the user model and the topic of interest. The method can include presenting, by the processing system, an overlay on a graphical user interface of the search engine, wherein the graphical user interface includes the search query field, and wherein the overlay includes the search query.

One or more aspects of the subject disclosure include a machine-readable medium, including executable instructions that, when executed by a processing system including a processor, facilitate performance of operations. The operations can include detecting access, by a user, to a search engine, where the access causes a search query field for the search engine to be presented at a display. The operations can include obtaining a user model associated with the user, where the user model is generated based on current events, demographics of the user, a search history of the user, a media consumption history of the user, or a combination thereof. The operations can include determining a user activity that the user is engaged in or has been engaged in within a particular time period prior to the detecting the access to the search engine. The operations can include predicting a topic of interest for the user according to the user model and the user activity. The operations can include generating a search query according to the user model and the topic of interest, where the generating the search query is performed prior to user input at the search query field. The operations can include presenting the search query at the display.

Referring now to FIG. 1, a block diagram is shown illustrating an example, non-limiting embodiment of a communications network 100 in accordance with various aspects described herein. For example, communications network 100 can facilitate in whole or in part providing suggested search queries to a user. The suggested search queries can be presented before the user begins entering text into a search query field, although other embodiments allow for the suggested search queries to be presented during and after the search query field receives user input. As an example, access to a search engine by a user can be detected. The access can cause a search query field for the search engine to be presented at a display. A user model associated with the user can be obtained or otherwise accessed, where the user model is generated based on various information that is or is not related to the user such as current events, demographics of the user, a search history of the user, a media consumption history of the user, or a combination thereof. In one embodiment, a user activity can be determined that the user is engaged in or has been engaged in within a particular time period prior to the detecting the access to the search engine. A topic of interest for the user can be predicted according to the user model and the user activity. A search query can be generated according to the user model and the topic of interest. In one embodiment, the generating the search query can be performed prior to user input at the search query field. The search query can be presented at the display. In one or more embodiments, input from new monitors, current events, date, time, big data correlations, and so forth can be utilized, such as in conjunction with user associated characteristics and history. One or more of the exemplary embodiments are not limited to user characteristics, but rather can monitor and compile multiple types of inputs. For example, if the search engine being accessed is on a customer site, and the company has an outage in the area, then this input can help predict the search query to be utilized.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
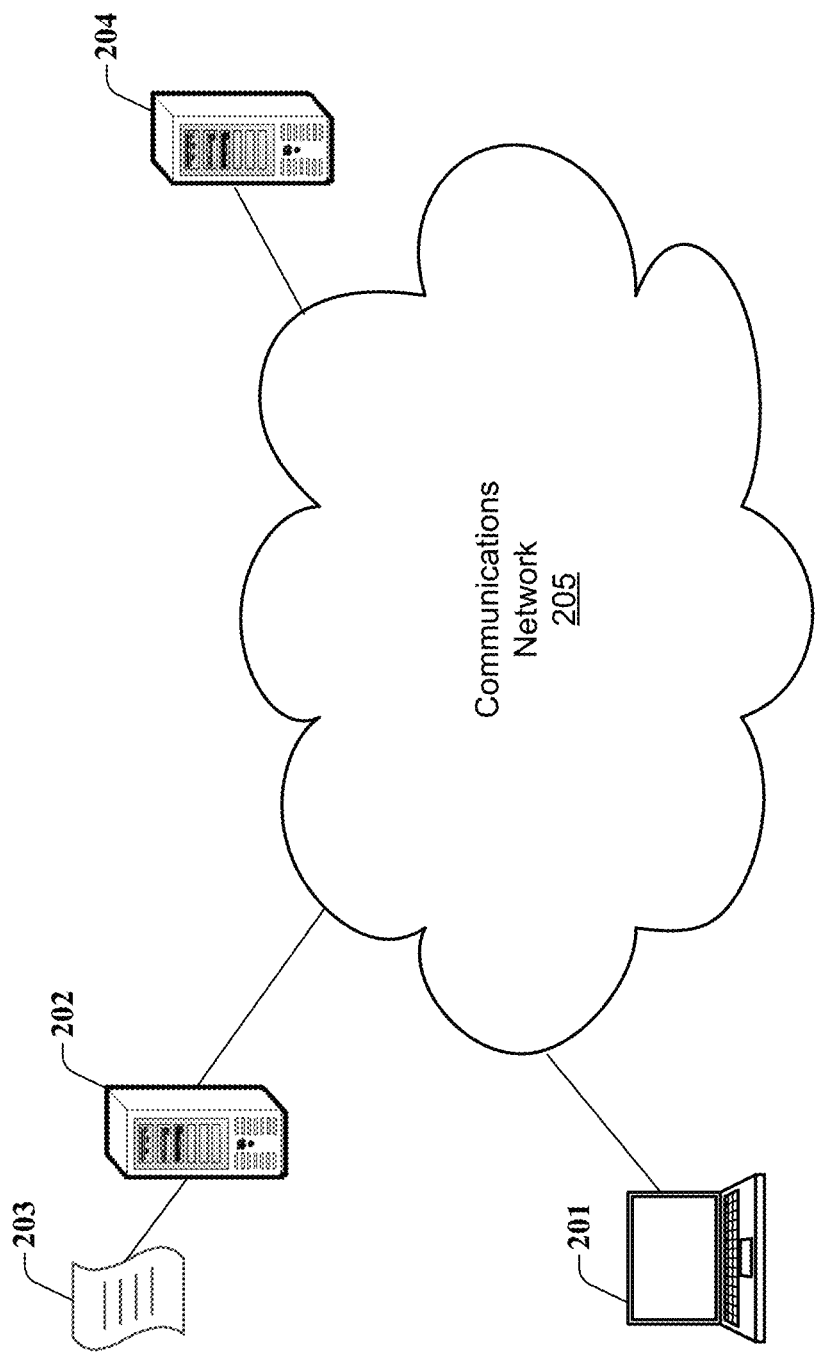
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 facilitates providing search queries to be used with a search engine that a user has accessed via a computing device 201. The computing device 201 can be various types of devices including a computer, mobile phone, set top box, gaming console, and so forth. System 200 is illustrated having a first server 202 (which can also be a computing resource in a virtual environment) that can be utilized for facilitating the generation of the search queries and/or maintaining and adjusting a user model 203 for the particular user and/or other users. System 200 is further illustrated having a second server 204 (which can also be a computing resource in a virtual environment) that manages or otherwise operates the search engine that is accessed by the user via computing device 201. These devices can communicate over a communications network 205 which can be various types of networks including wired and/or wireless networks.

In one embodiment, the server 202 and the server 204 are operated by different entities. For example, a first entity operating as a communications service provider of the communications network 205 can manage or otherwise operate server 202, which can include facilitating the generation of the search queries and/or maintaining and adjusting a user model for the particular user and/or other users. In this example, the server 202 can have access to various information associated with the user such as media consumption history, browser history, online purchasing history, user demographics, user location data, and so forth. A second entity operating as a search engine provider can manage or otherwise operate server 204, which can include presenting a Graphical User Interface (GUI) at computing device 201 that includes a search field. The search engine can be various types of search engines that utilize various search algorithms, including a general search engine that allows searching online for any type of information or a content specific search engine such as part of a web page that allows searching for particular information related to the web page (e.g., a search field on a merchant's web page, a university online course catalog, and so forth). In another embodiment, the entity operating the server 202 can be different from a communications service provider operating the communications network 205. In one embodiment, the same entity can operate both of servers 202 and 204 (or a single server can be used for the servers 202 and 204). In one embodiment, one or more of the functions described herein can be performed by the computing device 201 to facilitate generating search queries and/or adjusting the user model 203. Thus, system 200 can be implemented using various configurations, including utilizing various devices or combinations of devices to perform the functions that are described herein, which enable providing a user with suggested search queries for a particular search engine.

In one embodiment, a user at the computing device 201 can access a search engine, such as over the Internet, which is provided via server 204. The search engine access by the user can be detected, such as by the computing device 201 and/or by the server 202. The access detection can initiate or otherwise facilitate the process of providing recommended search queries at the computing device 201. The access to the search engine can cause a search query field for the search engine to be presented at a display coupled to the computing device 201, such as in a browser window. In one embodiment, an entity that manages the search engine can be determined or otherwise identified, such as by the computing device 201 and/or by the server 202. The detection of the user access to the search engine can also cause the user model 203 associated with the user to be obtained or otherwise accessed. In one embodiment, the access detection can be based on the user opening a search engine web page in the user's browser. In one embodiment, search engine access can be detected prior to the user entering any input into the search query field of the search engine.

As an example, the user model 203 can be maintained or otherwise managed by the server 202, although in other embodiments other devices (including the computing device 201) can maintain or manage the user model for the user. The user model 203 can be generated according to various information that is related to the user and/or is not related to the user. For example, the user model 203 can be generated based on the user's browsing history, the user's search history, the user's account characteristics, the user's account activity, and/or personal or other information that the user directly inputs into the computing device and/or provides to the server 202. In one embodiment, some or all of the information can be limited to particular time periods, such as less than one year, although other time periods can be utilized. In another embodiment, the information collected and synthesized for generating or adjusting the user model 203 can be weighted based on various factors, such as the age of the information (e.g., providing a higher weight to more recent browser history data as compared to older browser history data). In one embodiment, the information associated with the user account can be related to various types of accounts such as a communications service provider account, a merchant account, and so forth. Other information that can be utilized in the user model 203 can include time of day and location, including data about what searches are most common at this time and location; customer demographics and their correlations with what searches are popular; current popular searches within this immediate time period; most popular web site visits during this immediate time period; major news stories and trends during this immediate time period; and/or other big data trends which show correlations with search query content. In one embodiment, the user model 203 can be generated at least based on current events, demographics of the user, a search history of the user, and/or a media consumption history of the user.

In one or more embodiments, the user model 203 can be updated or otherwise adjusted, such as periodically according to a schedule, based on received information such as a recent search history of the user, or triggered by other events. In one or more embodiments, the server 202 can proactively adjust the user model 203 such as through monitoring browser and consumption history, obtaining account change information from other servers, and so forth. In another embodiment, the server 202 can receive the various information from various sources, such as from the computing device 201. As described herein, the collection and/or use of this information can be according to authorization by the user.

In one embodiment, one or more topics of interest can be predicted or otherwise determined for the user according to the user model 203. The prediction can be performed by the computing device 101 and/or the server 202. In one embodiment, a search query can be generated according to the user model 203, the topic of interest and/or an identity of the entity. In one embodiment, the predicting of the topics of interest and/or the generating of the search query can be performed prior to user input at the search query field. In another embodiment, the topics of interest and/or the search query can be generated in conjunction with user input at the search query field, such as utilizing detected keystrokes to further predict topics of interest and/or search queries. In another embodiment, the predicting of the topics of interest and/or the generating of the search query can be performed after the user input has been entered at the search query field, such as utilizing an inputted search query to further predict topics of interest and/or search queries. In one embodiment, various hierarchies can be utilized for presenting the topics of interest, such as presenting topics of interest and receiving a selection of one of the topics of interest which results in presenting of a set of sub-topics related to the selected topic of interest. Any number of layers of hierarchy can be utilized for enabling the user to select a focused sub-topic of interest.

The computing device 201 can then present the search query at the display. In one embodiment, the presenting of the search query at the computing device 201 can include presenting an overlay on a graphical user interface of the search engine. For example, the search engine can employ a graphical window that includes a search query field which allows for user input via text at the computing device 201. The overlay can be introduced into or otherwise over a portion of the graphical window and can include text representative of a search query. In one embodiment, the overlay includes a selectable link for the generated search query. In one embodiment, the overlay can be smaller than the graphical window of the search engine, such as a pop-up or bubble which includes the search query. In another embodiment, the overlay can be positioned with respect to the search engine window so as to avoid or reduce blocking relevant information, such as positioned over a blank area of the graphical window so as not to obstruct the search query field. In one embodiment, the positioning of the overlay can be based on minimizing blocking relevant information or otherwise strategically positioned, such as positioning the overlay over certain advertisements included in the graphical window of the search engine. In one embodiment, the search query can be multiple search queries that are included in the overlay. Selectable links corresponding to the multiple search queries can be provided in the overlay. In one embodiment, a user selection of one of the selectable links can cause the computing device 201 to automatically populate the search query field with the corresponding search query.

Search engines can have biases with respect to the search results that are provided. The biases can be inherent in the technique utilized by the search algorithm and/or can be biases implemented by the entity managing the search engine, such as prioritizing certain results for revenue purposes and so forth. In one embodiment, the generating the search query can include monitoring search results generated by the search engine and then determining a bias of a search algorithm employed by the search engine according to the monitoring, where the generating the search query is based on mitigating the bias. For example, monitoring search results for queries associated with Sport Utility Vehicle (SUVs) can indicate a bias for particular features of the SUVs that are described in the search results, a bias for a particular source of reviews in the search results, a bias for a particular price range in the search results, or some other bias. In one embodiment, the bias can be determined based on comparing search results provided by different search engines for the same sets of search queries to detect outlier items in the search results or correlated items in the search results which may indicate a bias of a particular search engine. Various correlation and/or decorrelation techniques can be applied to the search results to detect any biases.

In one embodiment, the generating of the search query can be performed without having knowledge of factors employed by the search algorithm. For example, a search algorithm of a particular entity may not be publicly known. However, the search query can be generated via equipment of another entity (e.g., server 202 and/or computing device 201) without knowledge of the factors employed by the search algorithm and in one example can be done so as to mitigate or otherwise reduce detected biases of the particular search engine. In one embodiment, the entity managing the user model 203 is distinct or otherwise independent from the entity operating the search engine.

In one embodiment, the predicting of the topic of interest may or may not be based on the identity of the entity operating the search engine. In one embodiment, the determined topic of interest for the user can be a group of topics of interest. The group of topics of interest can be included in the overlay so that the user can choose one of the topics and can further select a search query according to that topic of interest.

For example, one or more search queries can be generated for each of the group of topics of interest. The overlay can include each of the group of topics of interest and can include selectable links for each of the multiple search queries. A selection of one of the selectable links can cause the computing device 201 to populate the search query field with the corresponding one of the search queries. The above examples are described utilizing an overlay that can contain various information including one or more topics of interest and/or one or more search queries. Other examples can utilize various graphical configurations to present the various information including multiple overlays (e.g., a first overlay for topics of interest and a second overlay for search queries), a separate graphical window(s), and so forth.

In one embodiment, the user model can be adjusted, such as by the server 202 and/or the computing device 201, based on a history of recommended topics of interest and/or recommended search queries that were or were not selected by the user. For example, if it is determined that the user has never selected a suggested topic of interest for skiing vacations then the user model 203 can be adjusted accordingly, such as weighting other types of vacations more heavily. Similarly, if it is determined that (associated with the topic of interest of dining out) the user has never selected a recommended search query that includes a distance from the user's residence then the user model 203 can be adjusted accordingly, such as weighting other dining out factors more heavily.

In one embodiment, a user activity can be determined, such as by the computing device 201 and/or the server 202. For example, the user activity can be one that the user is engaged in or has been engaged in within a particular time period prior to the detecting the access to the search engine. The user model 203 can then be adjusted based on the user activity. The detection of the user activity can be performed using various techniques, such as monitoring applications that are running on the user's mobile communication device, information in a user's personal calendar, active communication sessions of device's associated with the user (e.g., an ongoing voice call or a video-on-demand session), location information of the user (e.g., at the beach), and so forth. In one embodiment, the user model 203 can be generated or adjusted based on a combination of current events, demographics of the user, a search history of the user, and media consumption history of the user. The communications network and configuration can vary. For example, in one embodiment a vehicle communication system can be utilized as a wireless access point and the search query engine can provide search query suggestions for a search engine that is being accessed via the vehicle communication system. In another embodiment, the search query engine can be utilized for suggesting a search query to be applied to a search engine operated by the vehicle communication system, such as searching of an owner's manual or a catalog of repair parts.

In one embodiment, the user model 203 can be adjusted, such as by the computing device 201 and/or the server 202, according to interaction of the user with search results returned by the search engine(s) for one or more search queries. For example, the computing device 201 and/or the server 202 can determine interaction of the user with search results returned by the search engine for the search query, where the determining the interaction includes determining search result access by the user to the search results and determining a consumption time associated with the search result access.

In one embodiment, selectable links that correspond to multiple search queries can be presented at the display. The search query field can be automatically populated by the computing device 201 with a first search query of the multiple queries responsive to a first selection of one of the selectable links, which causes the search engine to generate first search results. The search query field can also be automatically populated by the computing device with a second search query of the multiple search queries responsive to a second selection of another one of the selectable links, which causes the search engine to generate second search results. In this example, a portion of the first search results can be presented in an overlay at the display in conjunction with a presentation of the second search results by the search engine. The particular number of items of the first search results that are shown in the overlay can vary such as showing the first five items. This example facilitates the user in comparing different search results for different search queries related to a same topic of interest. This technique can be repeated any number of times for any number of subsequent search queries. In one embodiment, the overlay can present portions of multiple search results that were generated for different search queries related to the same topic of interest. In one embodiment, the number of items from each of the previous multiple search results that are shown in the overlay can be reduced for each subsequent search query to accommodate for the size of the overlay, such as showing six items from a first search query in the overlay in conjunction with second search results then reducing the number of items for the next search query such that three items from each of the first and second search queries are shown in the overlay in conjunction with the third search results, and so forth. As described herein, in one embodiment, the positioning of the overlay can be done so as to reduce blocking of the relevant information in the graphical window of the search engine.

In one or more embodiments, a user's interactions with search results can cause adjustments to the user model which then causes changes to future suggested topics of interest and/or suggested search queries. For instance, an amount of time that a user spends reviewing each page of the search results, an amount of time that a user spends reviewing individual results of the search results, how many pages of the search results that the user access, or a combination thereof can be monitored and used for adjusting the user model. In one embodiment, saving documents that are accessed from the search results can be monitored to indicate that the user has more of an interest in a particular result than if the user simply accessed a result of the search results without saving any of the result. In one or more embodiments, rejecting a search suggestion can be logged as a source of information for interpreting future query guesses or otherwise generating predicted search queries.

In one embodiment, one or more other search engines can be suggested to the user, such as presenting the suggested search engine(s) in the overlay on the search engine GUI. The recommendation for a different search engine can be generated according to the user model.

In one embodiment, a separate search can be executed in the background (e.g., automatically without requiring user initiation) based on the suggested search query (or based on a user-inputted search query) utilizing a different search engine. In this example, a portion of the search results from the different search engine can be presented in the overlay with the search results of the present search engine so that a user can compare search results for different search engines which utilized the same suggested search query or the same user-inputted search query. In one or more embodiments, the exemplary embodiments are not limited to a graphical medium. For example, audio signals, voice commands, or other non-graphical communications can be utilized with respect to one or more of the exemplary embodiments, including generating an audio signal to advise of a predicted search query.

In one embodiment, particular results of a list of search results which were not accessed by the user can be monitored and utilized for adjusting the user model. In one embodiments, detected biases or tendencies of a search engine can be presented or otherwise described to the user, such as in the overlay.

Figure 2B:
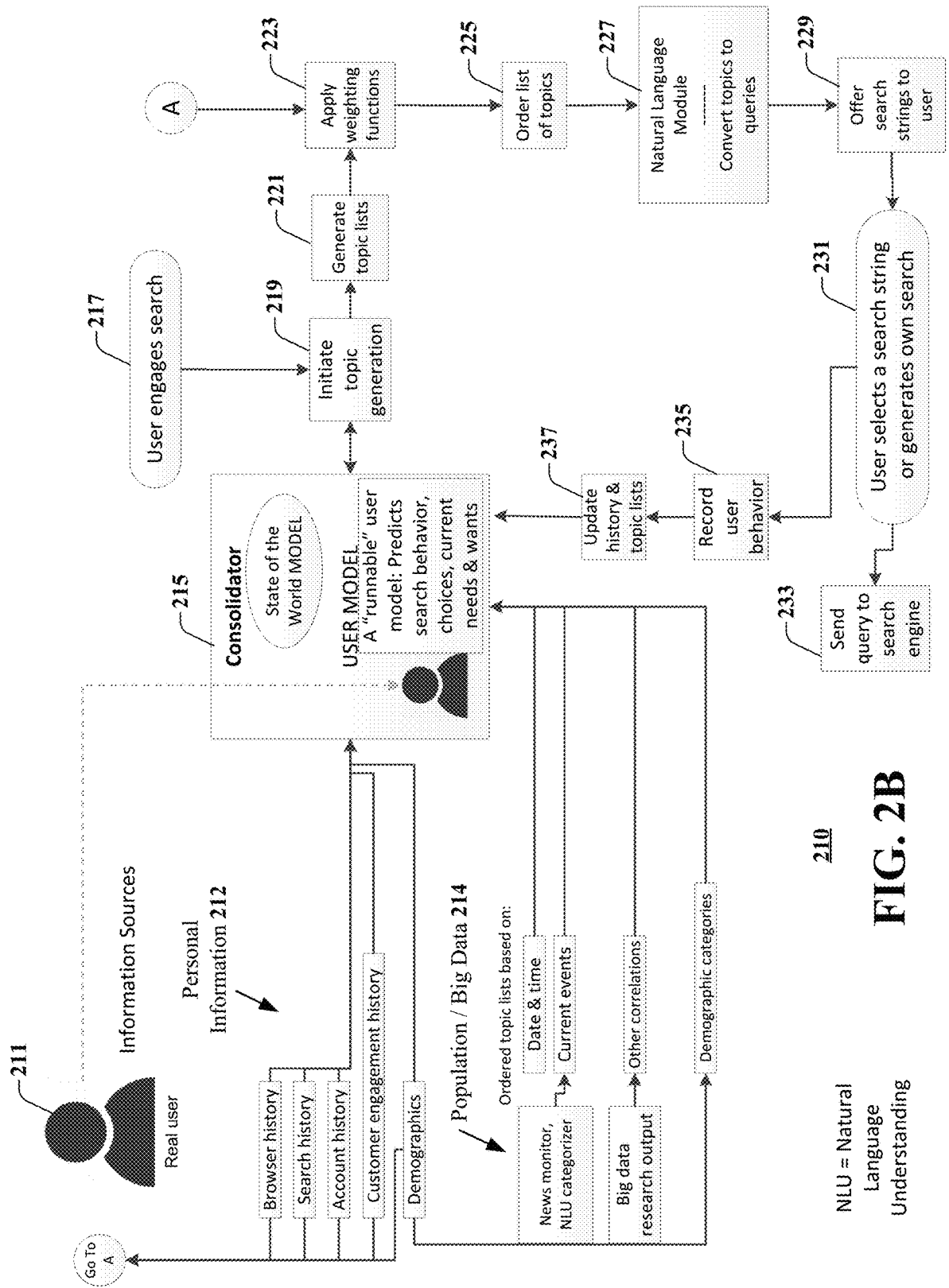
FIG. 2B depicts an illustrative embodiment of a data flow in accordance with various aspects described herein.

FIG. 2B depicts an illustrative embodiment of a data flow 210 for providing one or more topics of interest and/or search queries to a user 211 in accordance with various aspects described herein. In one embodiment, data can be integrated from a variety of big data sources 214 and personalized information sources 212. An example of such sources could include: time of day and location, including data about what searches are most common at this time and location; customer demographics and their correlations with what searches are popular; current popular searches within this immediate time period; most popular web site visits during this immediate time period; major news storied and trends during this immediate time period; other big data trends which show correlations with search query content; personal information about the user's recent browsing history; personal information about the user's recent search history; personal information about the users account characteristics and recent account activity; personal or other information that user directly inputs into the system. As described herein, the collection and analysis of this information can be responsive to an authorization provided by the user, such as via opt-in or opt-out.

In one embodiment the data can be assembled by a consolidator 215 (e.g., operating at server 202 and/or computing device 201 of FIG. 2A), which can build a runnable model of the user as well as a model of the surround world context and constraints which are applicable to the user's usual search behavior and tasks. In one embodiment, the model is runnable in the sense that at any time, it can be asked to simulate the user's own search (and other) behavior based upon the data sources which direct and inform the simulation algorithm. For instance, the runnable model can identify places the user wants to search and can predict what the user may do and say. For example, in attempting to provide the user with search help, the consolidator 215 can identify things the user will search for at the particular moment in time, such as by using an assembly of technologies or techniques including but not limited to: assembly of the population, personal, and contextual data; utilizing natural language processing to categorize the data sources which are discursive, e.g. content of web sites visited are categorized, linguistic content of recent searches are categorized, and so forth; matching other data to search which fit into a list of categories as well; predefining categories based upon a massive data research project frequently refreshed; assigning ratings to the categories generated, based upon comparison of specific data sources and known properties of the user; generating a reduced or short list of categories based upon ratings; and/or converting the categories into a regular natural language search string based upon a mapping matrix and modifying according to known properties of the user and the user's account or other characteristics.

In one embodiment at 217, the user can engage a search engine (e.g., open a search web page in a browser, access a search field on a web page, and so forth). At 219, topic generation can be initiated by the consolidator 215 utilizing the user model, which can include or otherwise be used in conjunction with a state of the world model that tracks current events (e.g., current events in areas that are of interest to the user although in another embodiment the state of the world model can generally track world events as well). At 221, the topic generation can result in a topics list being generated. At 223, weighting functions can be applied to the topics list. In one embodiment, the topics list can be weighted based on the personal information 212. At 225, the topics list can be ordered based on the weighting. In another embodiment, the weighting can be applied by the consolidator in generating the topics of interest, such as weighting browser history and search result access heavier than weighting demographics.

In one embodiment at 227, a natural language engine can be applied to convert the topics to suggested search queries and at 229 the search queries can be offered to the user, such as presenting the search queries in a popup or an overlay. In one or more embodiments, the system may or may not utilize the overlay, such as the system filling in the suggested query into the search field automatically, and allowing the user to simply hit "return" or erase the input and type what he or she actually wants as a search query if different from the recommendation. At 231, a user can select a search query or can chose to input his or her own search query. At 233, the search engine can utilize the search query in its algorithm while at 235 the user behavior in terms of selecting a particular one of the suggested search queries or ignoring all of the search queries can be recorded. This user behavior regarding query selection along with the ordered topic list can be provided at 237 to the consolidator 215 for further adjusting the user model.

In one embodiment, the output of this data flow 210 can be an advance from current technology, in that it does not provide only a simple set of controls, menus, or search terms, but rather models the user's own behavior. The data flow 210 can operate as a human assistant who echoes the user's own next steps. The response level of the data flow 210 can be adjusted. In one embodiment, the data flow 210 can provide the user's own words in complete sentence, natural language form.

In one embodiment, the data flow 210 can be as follows: a search function is displayed for a web page (e.g., a customer care web page); the assembled data sources point to current trends and the individual's characteristics and synthesizes a list, and billing query or bill due come up as high ranked categories. The category can be matched to "when is my bill due" but personal account information may have recorded a recent payment and causes converting the string to "has my bill payment been recorded" and then identifies in the record that this customer pays by check and so modifies the string to "has my payment by check been recorded" and/or "has my check cleared." In this example, when the user visits the search section of the user interface, the user is offered this information as a personalized search string, and simply clicking or tapping on it, rather than typing it, takes the user to a resolution. This characteristic is even more beneficial when using mobile devices.

While for purposes of simplicity of explanation, the respective features and processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the data flow described herein.

Figure 2C:
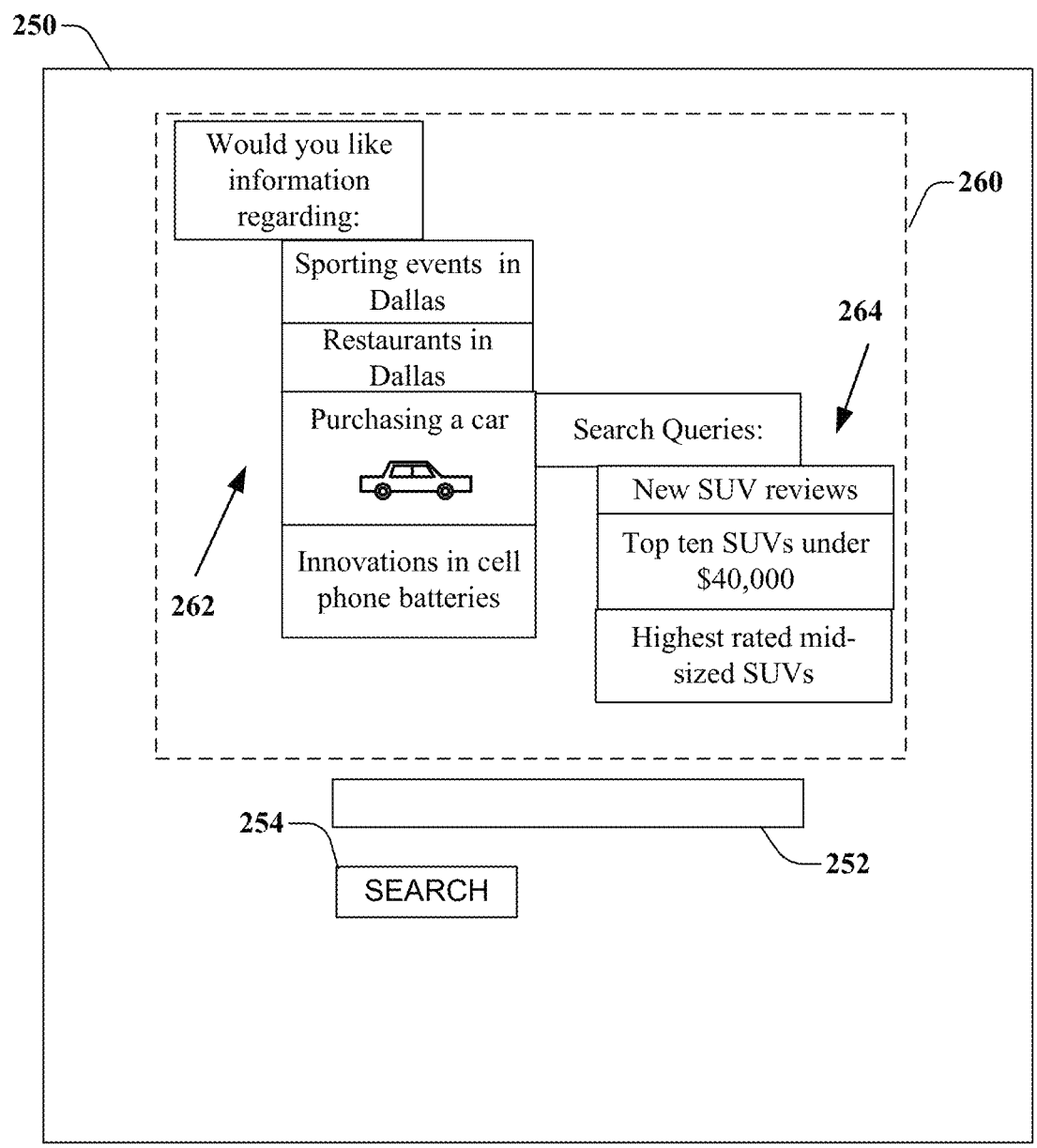
FIGS. 2C and 2D depict illustrative embodiments of user interfaces in accordance with various aspects described herein.

FIG. 2C is a block diagram illustrating an example, non-limiting embodiment of a GUI 250 provided at a display by a computing device functioning within the communication network of FIG. 1 and/or with system 200 in accordance with various aspects described herein. The GUI 250 can be a window that is generated when a search engine is accessed at the computing device 201. The GUI 250 can include a search query field 252 and a search button or icon 254 that initiates a search by the search engine. In one embodiment, an overlay 260 can be presented in conjunction with the GUI 250.

As described herein, the overlay 260 can include suggested search queries 264 for the search engine that were generated or otherwise determined based on various information in a user model including one or more of the user's browsing history; the user's search history; the user's account characteristics; the user's account activity; personal or other information that the user directly inputs; time of day and location including data about what searches are most common at this time and location; customer demographics and their correlations with what searches are popular; current popular searches within this immediate time period; most popular web site visits during this immediate time period; major news stories and trends during this immediate time period; and/or other big data trends which show correlations with search query content.

In this example, the overlay 260 includes topics of interest 262 that are generated or otherwise determined from the user model. A selection of one of the topics of interest (e.g., "Purchasing a car") can result in a set of suggested search queries 264 being presented in the overlay 260. In this example, the suggested topics of interest can be of any number (four of which are shown) and can include a variety of topics. For instance in this example, the user may currently be located in Dallas and, based on the user model, the suggested topics of interest include "Sporting events in Dallas" and "Restaurants in Dallas." The suggested topics of interest can further include other topics that are not location dependent but are based on the user model, such as "Purchasing a car" and "Innovations in cell phone batteries." These two topics of interest can be based on a synthesis of various information in the user model as described herein. The suggested topics of interest 262 are shown presented as text, however, images or other graphics an also be utilized in place of or in addition to the text to represent the topics of interest, such as illustrated in FIG. 2C with respect to the topic of interest 262 for "Purchasing a car." The overlay 260 can be positioned and/or repositioned if additional information is being added to the overlay so as to avoid or mitigate obstructing a user's view of information in the GUI 250. For example, open space can be determined that does not block the search query field 252 or the search button 254 and the overlay 260 can be positioned in the open space. In another embodiment such as where no open space exists in the GUI 250 to accommodate the overlay 260, particular information in the GUI can be determined to be less relevant and can be blocked by the overlay 260, such as advertising information presented by the GUI 250. In one embodiment, the size and/or shape of the overlay 260 can be adjusted to avoid or mitigate blocking the information of the GUI 250. In another embodiment, the amount of information in the overlay 260 can be adjusted to avoid or mitigate blocking the information of the GUI 250. In another embodiment, the overlay 260 can be presented as a series of overlay of smaller size to avoid or mitigate blocking the information of the GUI 250.

Continuing with this example, the set of suggested search queries 264 can be generated based on the user model which can include knowledge of the user's past car purchases, size of family, history of vacation locations, budget, user preferences, family preferences, and so forth. In one embodiment, the overlay 260 including the topics of interest 262 and/or the suggested search queries 264 can be presented prior to the user inputting any information in the search query field 252. In another embodiment, the overlay 260 can be presented in conjunction with the user input such as while individual letters are being inputted at the computing device 201 or after the inputting has ceased, such as after expiration of a particular time period that indicates that the user has finished entering the text. In this example, the individual letter(s) or the completed text input in the search query field 252 can be utilized in conjunction with the user model for generating topics of interest and/or suggested search queries which can be presented via the overlay 260 before or after the search result are presented in the GUI 250. In one embodiment, a selection by the user of one of the search queries 264 which can be selectable links can automatically populate the search query field 252.

Figure 2D:
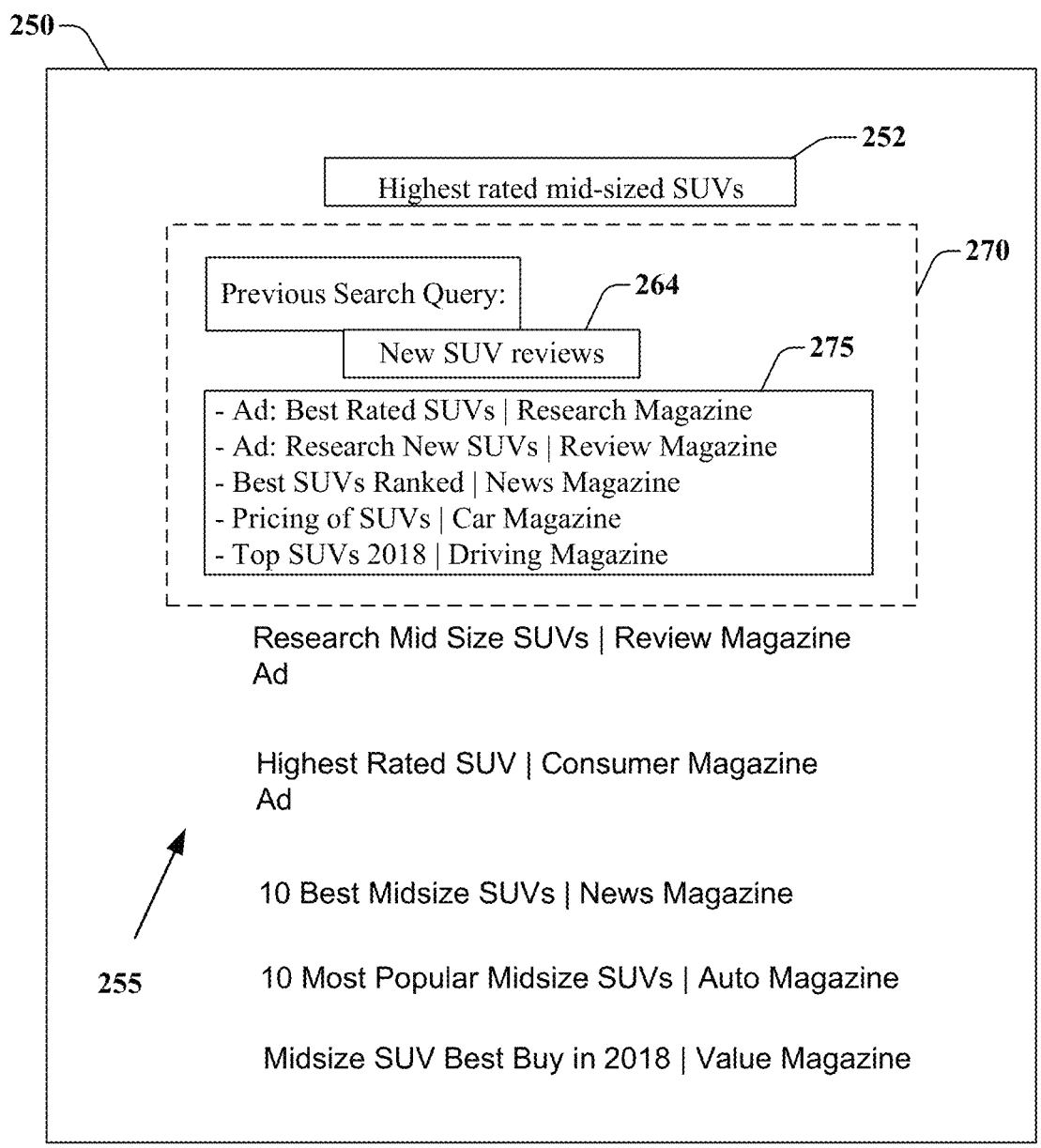

Referring to FIG. 2D, an embodiment is illustrated in which an overlay 270 is presented in conjunction with search results 255 of the search engine in the GUI 250. Overlay 270 can be presented in a manner similar to overlay 260 including one or more of re-sizing, re-shaping, in a series of overlays, selectively obstructing less relevant information of the GUI 250, adjusting an amount of information included in the overlay, and so forth in order to accommodate the GUI 250. In this example, a user selection of the selectable link for the "Highest rated mid-sized SUVs" of search queries 264 (in overlay 260 of FIG. 2C) causes population of the search query field 252 which can result in the search results 255 being presented in the GUI 250. The overlay 270 can include a previously selected search query 264 ("New SUV reviews) and can include a portion of the search results 275 that were generated by the search engine for that particular suggested search query. The overlay 270 thus allows a user to see the difference between suggested search queries without the need to go back and forth with different searches or to open another GUI for the search engine. In one embodiment, the overlay 270 can present more than one past search query 264 and more than one past portion of search results 275, so that the user can compare more than two different suggested search queries 264.

Figure 2E:
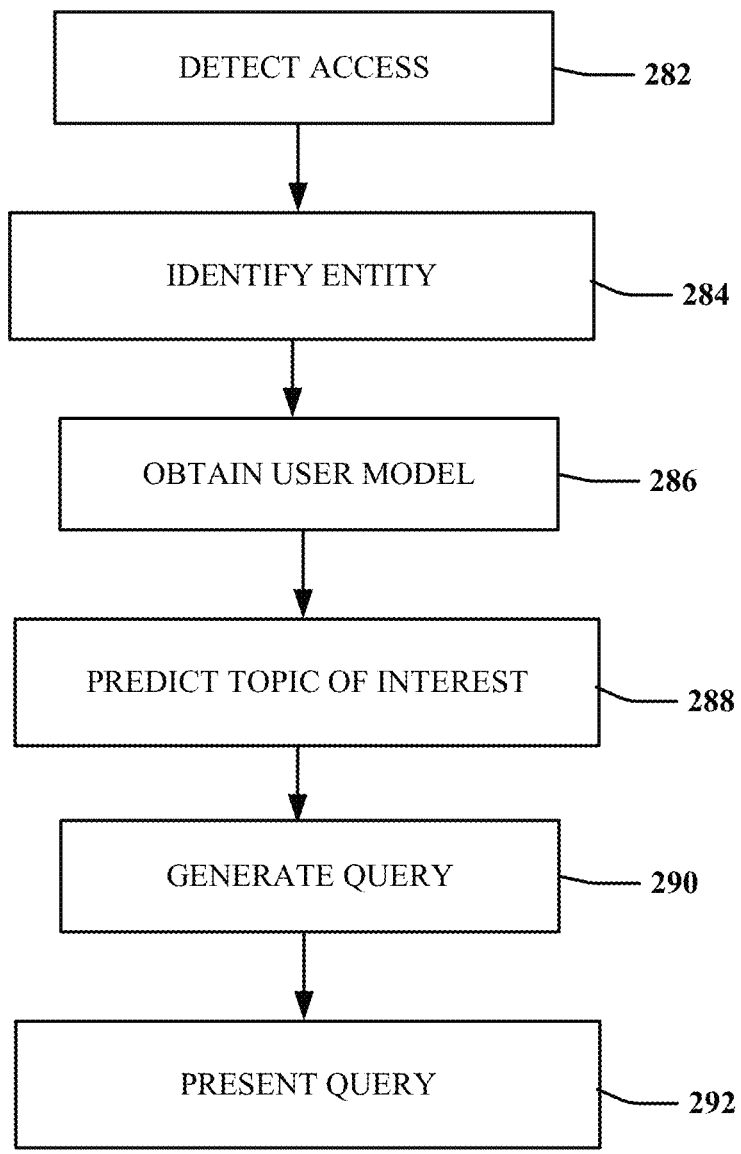
FIG. 2E depicts an illustrative embodiment of a method in accordance with various aspects described herein.

FIG. 2E depicts an illustrative embodiment of a method 280 in accordance with various aspects described herein. Method 280 facilitates providing a user with one or more suggested topics of interest and/or one or more suggested search queries based on various information including information associated with the user and/or general information. Method 280 can be implemented by a single device or a combination of devices, and can be utilized in conjunction with various types of search engines including general search engines (e.g., the search engine available from Google) or content specific search engines such as on a merchant's webpage. Method 280 can be integrated with the execution of the search engine to provide for a seamless interface for suggesting topics of interest and/or search queries.

At 282, a processing system (e.g., computing device 201 and/or server 202 of FIG. 2A) can detect access by a user to a search engine. The access can cause a search query field for the search engine to be presented at a display, such as in a user's browser presented by the computing device 201. In one embodiment, the access is detected when the search engine webpage is opened, such as prior to the user inputting any text in the search query field. In one embodiment at 284, the search engine being accessed can be identified, such as determining an entity that operates the search engine.

At 286, the processing system can obtain a user model (e.g., user model 203 of FIG. 2A) associated with the user in response to detecting the search engine access. The obtaining of the user model can be done in a number of different ways, such as accessing the user model stored locally, receiving the user model (or a relevant portion thereof) from a remote source, interacting with a remote source to utilize or receive information of or generated by the user model, combinations thereof, and so forth. In one embodiment, the user model can be generated based on current events, demographics of the user, a search history of the user, a media consumption history of the user, or a combination thereof.

In one embodiment at 288, the processing system can predict one or more topics of interest for the user according to the user model. At 290, the processing system can generate or otherwise determine a search query according to the user model. In one embodiment, the search query can be generated according to the user model and the topic of interest. In one embodiment, the generating the search query can include: monitoring search results generated by the search engine; and determining a bias of a search algorithm employed by the search engine according to the monitoring, where the generating the search query is based on mitigating the bias. In this example, the monitoring and/or the determining bias can be performed by various devices or combinations of devices, such as the computing device 201, the server 202, or another device.

In one embodiment, generating the search query can be performed prior to user input at the search query field, where the search query is a plurality of search queries, where the overlay includes selectable links for the plurality of search queries, and the processing system can populate the search query field with one of the plurality of search queries responsive to a selection of one of the selectable links. In one embodiment, the processing system can identify a first entity that manages the search engine, where the generating the search query is based on an identity of the first entity, and where the first entity is distinct from a second entity that manages the user model of the user. In one embodiment, the generating the search query is performed without having knowledge of factors employed by a search algorithm of the search engine.

At 292, an overlay can be presented on a graphical user interface of the search engine, where the graphical user interface includes the search query field, and where the overlay includes the search query. As an example, the overlay can be generated by the server 202 and provided to the computing device 201 for presentation or the computing device can generate and present the overlay. In one embodiment, the overlay can include a selectable link for the search query, and the processing system can populate the search query field with the search query responsive to a selection of the selectable link by the user at the computing device 201. In one embodiment, the processing system can present a portion of other search results generated from one or more other search queries in the overlay in conjunction with a presentation of search results generated from the current search query. In one embodiment, the topic(s) of interest predicted at 288 can be presented in the overlay to facilitate the user selection of a search query, such as in a tree structure, drop down menu, pop-up, and so forth.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A-2E and 3. For example, virtualized communication network 300 can facilitate in whole or in part providing suggested search queries to a user, such as when the user accesses a search engine. The search queries and/or topics of interest associated with the search queries can be generated according to a user model. In one embodiment, the user model can be generated based on various information that is or is not related to the user such as current events, demographics of the user, a search history of the user, a media consumption history of the user, or a combination thereof.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
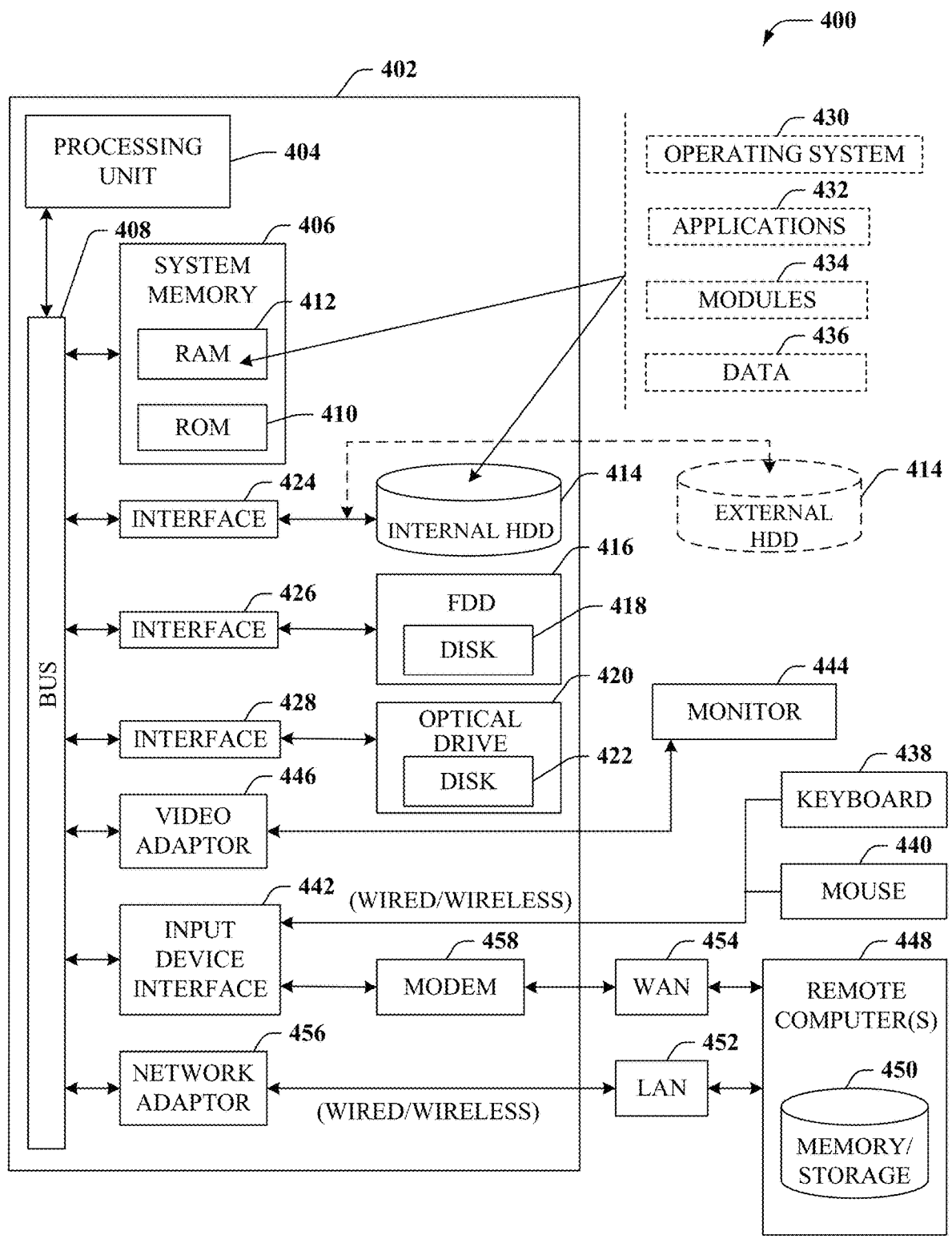
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing suggested topics of interest and/or search queries to a user, such as when the user accesses a search engine. The search queries and/or topics of interest can be generated according to a user model. In one embodiment, the user model can be generated based on various information that is or is not related to the user such as current events, demographics of the user, a search history of the user, a media consumption history of the user, or a combination thereof.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
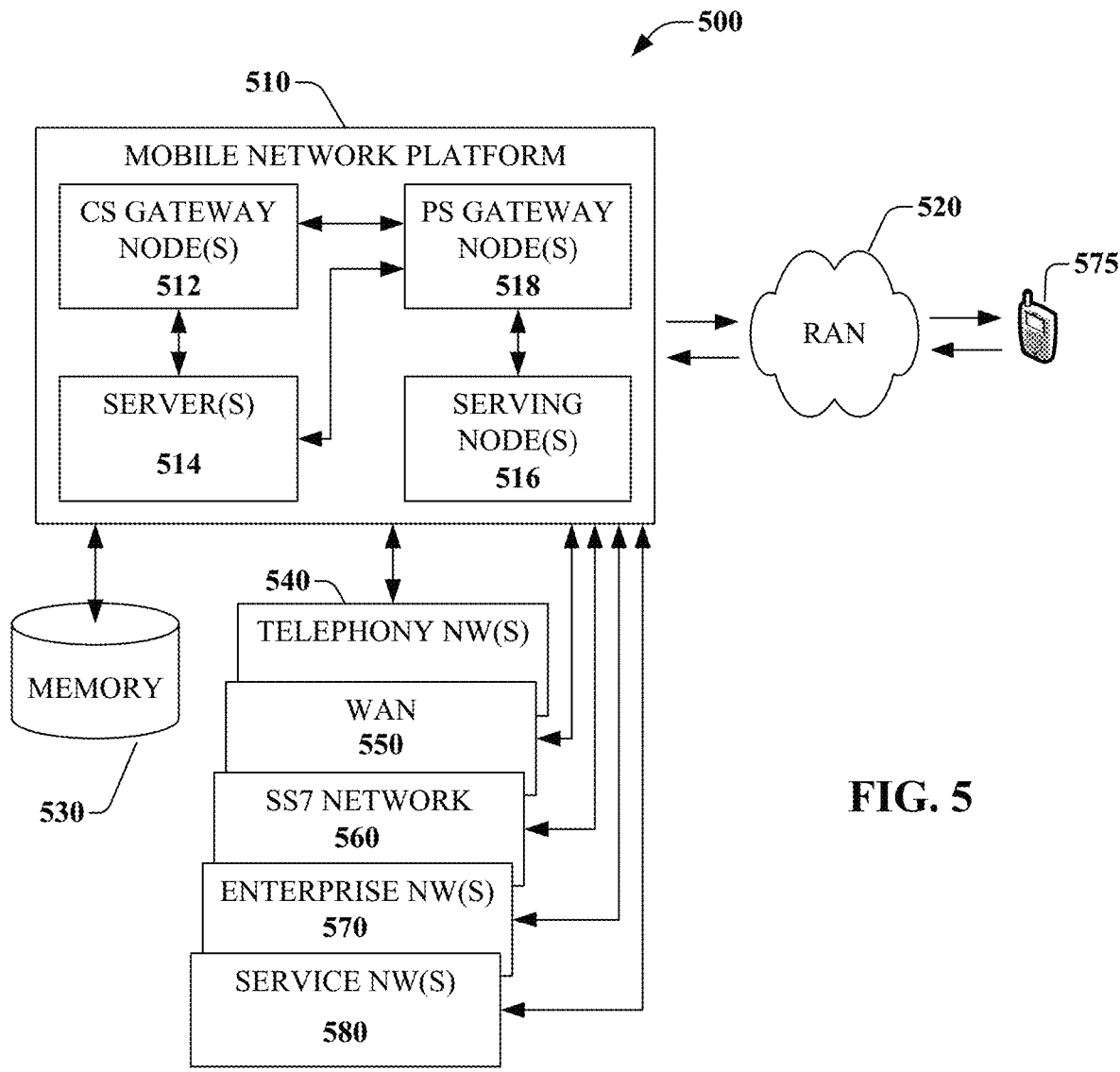
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing suggested topics of interest and/or search queries to a user, such as when the user accesses a search engine. The search queries and/or topics of interest can be generated according to a user model. In one embodiment, the user model can be generated based on various information that is or is not related to the user such as current events, demographics of the user, a search history of the user, a media consumption history of the user, or a combination thereof.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
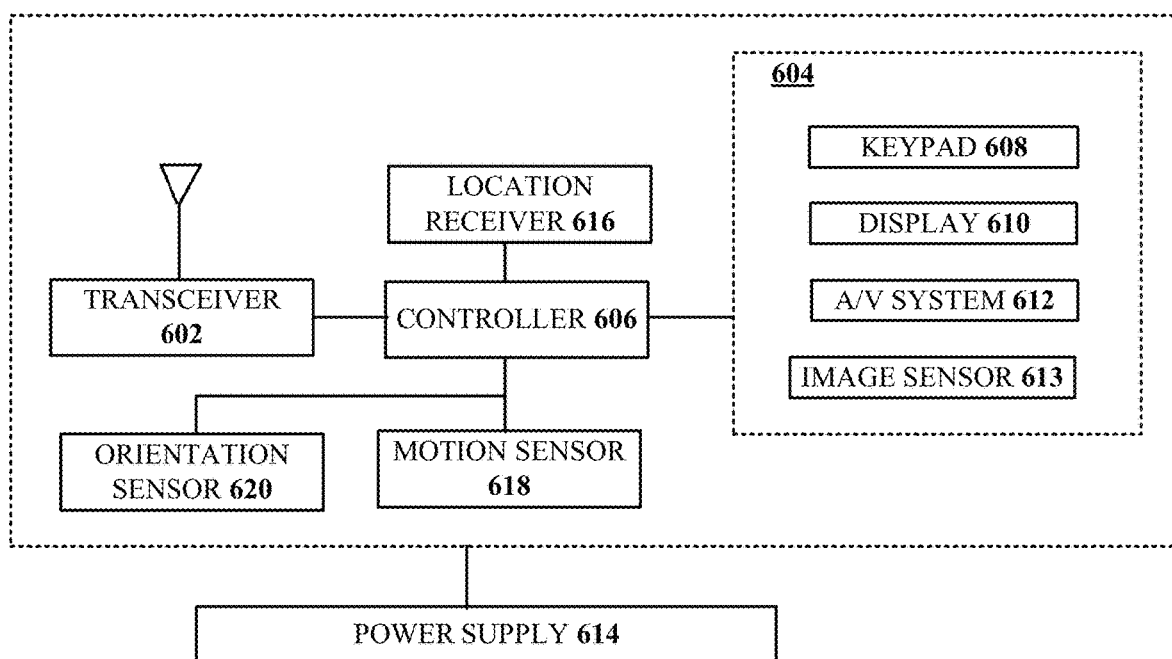
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part providing suggested topics of interest and/or search queries to a user, such as when the user accesses a search engine. The search queries and/or topics of interest can be generated according to a user model. In one embodiment, the user model can be generated based on various information that is or is not related to the user such as current events, demographics of the user, a search history of the user, a media consumption history of the user, or a combination thereof. In one embodiment, the suggested topics of interest and/or search queries can be presented in an overlay in conjunction with a GUI of the search engine.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having GUI elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In one or more embodiments, a process is provided that facilitates or otherwise enables a dynamic user interface in searching for online information such as web pages and smartphone applications, which is augmented by big data. In one embodiment, the system can provide a user interface that operates to tell the user what they want to search for. In one embodiment, as a supplement to a search entry box, a user can be provided with the ability to choose to be told what they want to search for. As an example, this can be implemented as a user choice or can be offered to the user automatically. In one embodiment, predicted search queries can be a short list of synthesized natural language queries. For instance, this process can incorporate an algorithm and/or can provide a full predictive model of the user which makes decisions and behaves in a way that allows more predictive, relevant, and accurate search results. In one embodiment, the predictive user model can be utilized by or shared among various entities.

In one or more embodiments, the system and methodology described herein can provide an easier and more efficient interaction with search systems for users, consumers and for businesses. This can include shorter transactions times, and more relevant, accurate and quicker resolutions for problems. One or more embodiments can mitigate a search string problem where a user types in everyday language but that inputted language is not matched by the system to their actual intent, or the user is given numerous search results most of which are incorrect or not relevant, necessitating extended time required for modifying search, multiple searches, and overall frustration with the process.

In one or more embodiments, the system and methodology can provide benefits beyond user efficiency and satisfaction with search functions. For example, the system can learn to understand the user better, providing benefit for the user (e.g., personalization, efficient interactions, and more directed interactions that match the user's interests) with respect to other services that the entity operating the system provides to the user, such as where the entity is a communications service provider for the user. In one embodiment, the entity operating the system can achieve better user retention due to personalization and better serving the user. In one embodiment, the user model of the user, in whole or in selected parts, can be shared or made accessible (including limited access) with certain other entities such as based on authorization from the user. In one or more embodiments, the system can be a benefit, financial or otherwise, to the company or entity that is gathering and sharing the information with other entities. In one embodiment, the user model can be shared with users for their own purposes (e.g., as an avatar). For instance, the generating of the user model, the updating of the user model, the sharing of the user model, the gathering of information, the sharing of information, and so forth can be performed pursuant to the authorization of the particular user.

In one embodiment, the system and methodology provide: automatically anticipating user needs and expectations; interpreting user's search intention by utilizing personalization and big data; and/or a quick and seamless integration of personal thoughts, information needs, and search results. In one or more embodiments, an automated search entry process with data driven support is provided that is based on a fully predictive model of a user that makes decisions and behaves in a way that more accurately determines what a user is searching for. One or more embodiments, require less time and energy for conducting multiple searches or modifying search terms and strings. One or more embodiments, can update the user model in real time, such as based on current activities of the user and so forth.

In one or more embodiments, a user interface and/or a mode of interaction is provided, based upon data and predictive models. In one or more embodiments, the system and/or methodology described herein can be used with any search algorithm(s), and has the flexibility of allowing any, and future, data and/or predicting technology to be implemented to suggest search queries and/or topics of interest for a user. One or more exemplary embodiments utilize a number of predictive elements together, which can include optional behavioral input from the user, to realize a user interface system, which, in one or more instantiations, fills in search strings with natural language generated text based upon the data and predictive models, to act as a personal assistant.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data or other aspects of the embodiments described herein can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing user behavior, device behavior (e.g., functions, characteristics, operational tendencies, and so forth), operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
      detecting access, by a user, to a first search engine, wherein the access causes a first search query field for the first search engine to be presented at a display coupled to the device, and wherein a first entity that manages the first search engine is identified and is distinct from a second entity that manages a user model associated with the user;
      performing a search using a second search engine using user data obtained from the user model associated with the user to obtain a plurality of topics and subtopics of interest;
      presenting the plurality of topics and subtopics of interest for user interaction by the user at the display;
      generating a generated search query responsive to the user interaction with the plurality of topics and subtopics of interest, wherein the generating of the generated search query is performed prior to user input at the first search query field, and wherein the user model is generated based on current events, demographics of the user, a search history of the user, a media consumption history of the user, or a combination thereof;
      populating the first search query field with the generated search query;
      responsive to user interaction with the first search query field, submitting the generated search query to the first search engine;
      adjusting the user model based on the user interaction with the plurality of topics and subtopics of interest;

submitting the generated search query to a plurality of search engines other than the first search engine;

comparing search results generated by the plurality of search engines to search results generated by the first search engine;

determining a bias of a search algorithm employed by the first search engine according to the comparing, and further adjusting the user model based on the comparing, wherein the further adjusting the user model is based on mitigating the bias.

2. The device of claim 1, wherein the generating the generated search query comprises generating a plurality of generated search queries without the device having knowledge of factors employed by the search algorithm, the operations further comprising:

presenting an overlay on a graphical user interface of the first search engine, wherein the graphical user interface includes the first search query field, wherein the overlay includes selectable links for the plurality of generated search queries; and wherein the populating the first search query field with the generated search query comprises populating the first search query field with one of the plurality of generated search queries responsive to a selection of one of the selectable links.

3. The device of claim 1, wherein the presenting the topics and subtopics for the user interaction by the user at the display further comprises presenting an overlay on a graphical user interface that includes the first search query field, wherein the overlay includes the plurality of topics and subtopics of interest.

4. The device of claim 1, wherein the user model is adjusted based on a history of generated search queries that were selected by the user, and wherein the populating the first search query field with the generated search query is via text at the display, audio signals, or a combination thereof.

5. The device of claim 1, wherein the user model is adjusted based on a user activity, and wherein the user activity is based on a detected activity that the user is engaged in or has been engaged in within a particular time period prior to the detecting the access to the first search engine.

6. The device of claim 1, wherein the user model is generated based on current events, demographics of the user, search history of the user, and media consumption history of the user.

7. The device of claim 1, wherein the user model is adjusted according to interaction of the user with search results returned by the first search engine for the generated search query, and wherein the interaction is determined by:

determining search result access by the user to the search results returned by the first search engine and determining a consumption time associated with the search result access.

8. The device of claim 1, wherein the generated search query is one of a plurality of generated search queries, wherein the presenting the generated search query further comprises presenting selectable links for the plurality of generated search queries, and wherein the operations further comprise:

populating the first search query field with a first generated search query of the plurality of generated search queries responsive to a first selection of one of the selectable links, wherein the populating the first search query field with the first generated search query facilitates the first search engine generating first search results;

populating the first search query field with a second generated search query of the plurality of generated search queries responsive to a second selection of another one of the selectable links, wherein the populating the first search query field with the second generated search query facilitates the first search engine generating second search results; and presenting a portion of the first search results at the display in conjunction with a portion of the second search results.

9. The device of claim 8, wherein the operations further comprise presenting an overlay on a graphical user interface that includes the second search results, wherein the overlay includes the portion of the first search results.

10. A method, comprising:

detecting, by a processing system including a processor, access to a first search engine by a user, wherein the access causes a first search query field for the first search engine to be presented at a display, and wherein a first entity that manages the first search engine is identified and is distinct from a second entity that manages a user model associated with the user;

obtaining, by the processing system, the user model associated with the user, wherein the user model is generated based on current events, demographics of the user, a search history of the user, a media consumption history of the user, or a combination thereof;

performing a search using a second search engine using user data obtained from the user model associated with the user to obtain a plurality of topics and subtopics of interest;

presenting, by the processing system, an overlay on a graphical user interface of the first search engine, wherein the overlay on the graphical user interface includes the plurality of topics and subtopics of interest for user interaction by the user;

generating, by the processing system, a generated search query distinct from the topics and subtopics of interest according to the user model and the user interaction with the topics and subtopics of interest, wherein the generating of the generated search query is performed prior to user input at the first search query field;

presenting, by the processing system, the generated search query in the first search query field;

responsive to user interaction with the first search query field, submitting the generated search query to the first search engine;

adjusting the user model based on the user interaction with the plurality of topics and subtopics of interest;

submitting the generated search query to a plurality of search engines other than the first search engine;

comparing search results generated by the plurality of search engines to search results generated by the first search engine;

determining a bias of a search algorithm employed by the first search engine according to the comparing, and further adjusting the user model based on the comparing, wherein the further adjusting the user model is based on mitigating the bias.

11. The method of claim 10, wherein the generating the generated search query comprises:

monitoring search results generated by the first search engine; and determining the bias of the search algorithm employed by the first search engine according to the monitoring, wherein the generating the generated search query is based on the mitigating the bias.

12. The method of claim 10, wherein the overlay includes a selectable link for the generated search query, and further comprising:
   populating, by the processing system, the first search query field with the generated search query responsive to a selection of the selectable link.

13. The method of claim 10, wherein the generated search query is one of a plurality of generated search queries, wherein the overlay includes selectable links for the plurality of generated search queries, and further comprising:
   populating, by the processing system, the first search query field with one of the plurality of generated search queries responsive to a selection of one of the selectable links.

14. The method of claim 10, wherein the generating the generated search query is based on the identity of the first entity.

15. The method of claim 10, wherein the generating the search query is performed without having knowledge of factors employed by the search algorithm employed by the first search engine.

16. The method of claim 10, further comprising:
   presenting a portion of other search results generated from another search query in the overlay in conjunction with a portion of search results generated from the generated search query.

17. A non-transitory machine-readable medium, comprising executable instructions that, when executed by a processing system including a processor, facilitate performance of operations, the operations comprising:
   detecting access, by a user, to a first search engine, wherein the access causes a first search query field for the first search engine to be presented at a display, and wherein a first entity that manages the first search engine is identified and is distinct from a second entity that manages a user model associated with the user;
   obtaining the user model associated with the user, wherein the user model is generated based on current events, demographics of the user, a search history of the user, a media consumption history of the user, or a combination thereof;
   performing a search using a second search engine using user data obtained from the user model to obtain a plurality of topics and subtopics of interest;
   presenting the plurality of topics and subtopics of interest for user interaction by the user at the display;
   generating a generated search query distinct from the topics and subtopics of interest according to the user model and the user interaction with the plurality of topics and subtopics of interest, wherein the generating the generated search query is performed prior to user input at the first search query field;
   populating the first search query field with the generated search query;
   responsive to user interaction by the user with the first search query field, submitting the generated search query to the first search engine;
   adjusting the user model based on the user interaction with the plurality of topics and subtopics of interest;
   submitting the generated search query to a plurality of search engines other than the first search engine;
   comparing search results generated by the plurality of search engines to search results generated by the first search engine;
   determining a bias of a search algorithm employed by the first search engine according to the comparing, and
   further adjusting the user model based on the comparing, wherein the further adjusting the user model is based on mitigating the bias.

18. The non-transitory machine-readable medium of claim 17, wherein the generated search query is one of a plurality of generated search queries, wherein the populating the first search query field with the generated search query further comprises presenting an overlay on a graphical user interface, wherein the overlay includes selectable links for the plurality of generated search queries, and wherein the operations further comprise:
   populating the first search query field with one of the plurality of generated search queries responsive to a selection of one of the selectable links.

19. The non-transitory machine-readable medium of claim 17, wherein the user model is adjusted according to interaction of the user with the search results returned by the first search engine.

20. The non-transitory machine-readable medium of claim 17, wherein the user model is adjusted based on a user activity, and wherein the user activity is based on a detected activity that the user is engaged in or has been engaged in within a particular time period prior to the detecting the access to the first search engine.

* * * * *